(12) United States Patent
Ryu et al.

(10) Patent No.: US 12,319,351 B2
(45) Date of Patent: Jun. 3, 2025

(54) VEHICLE BODY STRUCTURE WITH A REINFORCED TRUNK HINGE MOUNTING PART

(71) Applicants: HYUNDAI MOTOR COMPANY, Seoul (KR); KIA CORPORATION, Seoul (KR)

(72) Inventors: Jong-Hyun Ryu, Yongin-si (KR); Se-Young Han, Yongin-si (KR); Ji-Woon Go, Pyeongtaek-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 311 days.

(21) Appl. No.: 17/962,944

(22) Filed: Oct. 10, 2022

(65) Prior Publication Data
US 2023/0278643 A1  Sep. 7, 2023

(30) Foreign Application Priority Data
Mar. 7, 2022 (KR) .......... 10-2022-0028630

(51) Int. Cl.
| | |
|---|---|
| *B62D 25/08* | (2006.01) |
| *B60J 5/10* | (2006.01) |
| *B62D 25/12* | (2006.01) |
| *B62D 27/02* | (2006.01) |

(52) U.S. Cl.
CPC .......... *B62D 25/087* (2013.01); *B60J 5/101* (2013.01); *B62D 25/12* (2013.01); *B62D 27/02* (2013.01); *E05Y 2900/548* (2013.01)

(58) Field of Classification Search
CPC .... B62D 25/08; B62D 25/087; B62D 25/105; B62D 25/12; B62D 25/02; B62D 27/203; B60J 5/10; B60J 5/101
USPC ............... 296/203.01, 4, 29, 30, 193.08, 76
See application file for complete search history.

(56) References Cited

U.S. PATENT DOCUMENTS 2,647,788 A * 8/1953 Kaiser .................... B60N 2/305
296/76

FOREIGN PATENT DOCUMENTS

| DE | 19842652 A1 | * | 3/2000 | ......... E05D 11/0054 |
|---|---|---|---|---|
| EP | 1634745 B1 | * | 1/2010 | ............ B60J 1/1884 |
| KR | H031880 U | * | 1/1991 | |
| KR | 20030016582 A | | 3/2003 | |

OTHER PUBLICATIONS

DE19842652 Text (Year: 2000).*
EP1634745 Text (Year: 1987).*
JPH031880 Text (Year: 1991).*

* cited by examiner

*Primary Examiner* — Dennis H Pedder
(74) *Attorney, Agent, or Firm* — Lempia Summerfield Katz LLC (57) ABSTRACT

A vehicle body structure with a reinforced trunk hinge mounting part includes a side outer rear extension 11 extending from a side outer 16 to the rear of a vehicle; a quarter inner 12 located under the side outer rear extension 11 and forming a space where wheels of the vehicle are mounted; a trunk hinge 31 installed on a front end of a trunk lid 30 and fastened to an outer surface of the side outer rear extension 11; and a connection member 35 connecting the side outer rear extension 11 to the quarter inner 12.

9 Claims, 9 Drawing Sheets

VEHICLE BODY STRUCTURE WITH A REINFORCED TRUNK HINGE MOUNTING PART

CROSS-REFERENCE TO RELATED APPLICATION

This application claims priority to and the benefit of Korean Patent Application No. 10-2022-0028630, filed on Mar. 7, 2022, the entire contents of which are incorporated herein by reference.

BACKGROUND

Field

The present disclosure relates to a vehicle body structure with a reinforced trunk hinge mounting part, which delivers a load to another part of the vehicle body.

Description of Related Art

Figure 1:
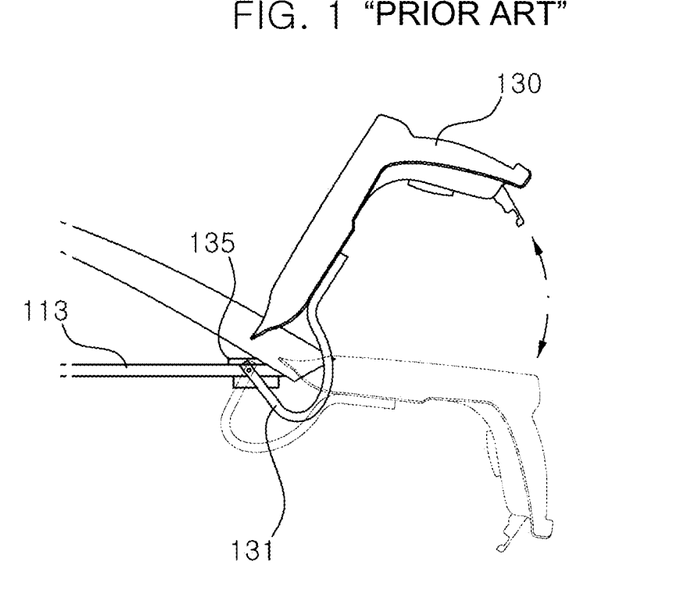
FIG. 1 is a side cross-sectional diagram showing a portion where a trunk lid is mounted according to the related art.

In general, a trunk for loading luggage is formed on the rear of a vehicle, and an upper portion of the trunk is opened and closed by a trunk lid 30.

The trunk lid 130 is installed on a vehicle body through a trunk hinge 131 mounted on one side of the vehicle body of the vehicle.

Typically, the trunk hinge 131 is formed in a goose neck type and mounts a front end of the trunk lid 130 on the vehicle body to open and close the trunk lid 130.

A reinforcing member 135 is applied to a portion where the trunk hinge 131 is mounted on the vehicle body, for example, a package tray 113 for locally reinforcing rigidity.

The trunk hinge 131 and the reinforcing member 135 are fastened to each other with the package tray 113 interposed therebetween, thereby reinforcing the rigidity of the portion to which the trunk hinge 131 is fastened.

However, we have discovered that since the reinforcing member 135 reinforces only the rigidity of the portion fastened to the trunk hinge 131, the rigidity may not be sufficiently reinforced up to the periphery thereof.

In addition, we have also found that since a rear wheel vehicle, particularly, a rear wheel drive electric vehicle has an increased load input to a rear portion of the vehicle body, it is desired to reinforce the rigidity of the rear portion of the vehicle body.

The contents described in Description of Related Art are to help the understanding of the background of the present disclosure, and may include what is not previously known to those of having ordinary skill in the art to which the present disclosure pertains.

SUMMARY OF THE DISCLOSURE

The present disclosure provides a vehicle body structure with a reinforced trunk hinge mounting part, which forms a load delivery path (load path) in a rear portion of a vehicle body while a trunk lid reinforces rigidity of a portion mounted on the vehicle body, thereby improving rigidity of the rear portion of the vehicle body.

In an embodiment of the present disclosure, a vehicle body structure with a reinforced trunk hinge mounting part includes: a side outer rear extension extending from a side outer to the rear of a vehicle; a quarter inner located under the side outer rear extension and forming a space where wheels of the vehicle are mounted; a trunk hinge installed on a front end of a trunk lid and fastened to an outer surface of the side outer rear extension; and a connection member connecting the side outer rear extension to the quarter inner.

The connection member connects the side outer rear extension to the quarter inner by each bonding upper and lower portions of the connection member to the side outer rear extension and the quarter inner spaced apart from each other.

The side outer rear extension includes a hinge mounting part formed in a width direction of the vehicle and having the trunk hinge fastened to an upper surface thereof, and a vertical part extending upward from the hinge mounting part, and the upper portion of the connection member is bonded to the vertical part.

The connection member is formed with a lower flange part bent from a longitudinal direction of the connection member so that the lower portion thereof is in contact with the quarter inner, and the lower flange part is in surface contact with and bonded to the quarter inner.

The trunk hinge and the connection member are disposed in a width direction of the vehicle.

The vehicle body structure with the reinforced trunk hinge mounting part further includes a reinforcing member bonded to a surface opposite to a surface of the side outer rear extension to which the trunk hinge is fastened in order to reinforce the rigidity of the side outer rear extension.

The reinforcing member includes a fastening part bonded to a lower surface of the side outer rear extension, and a reinforcing part extending upward from a side end of the fastening part and bonded to the side outer rear extension.

A mounting groove accommodating the reinforcing member is formed on the lower surface of the side outer rear extension, and the reinforcing member is seated inside the mounting groove and bonded to the side outer rear extension.

The side outer rear extension includes a hinge mounting part formed in the width direction of the vehicle and having the trunk hinge fastened to the upper surface thereof, and a vertical part extending upward from the hinge mounting part, and a portion of the upper portion of the connection member bonded to the vertical part has a part bonded to the outside of the reinforcing member, and the rest directly bonded to the vertical part.

The trunk hinge is a 4 bar link type.

The vehicle is a rear wheel drive vehicle and a rear-wheel that is a drive wheel is located in the quarter inner.

According to the vehicle body structure with the reinforced trunk hinge mounting part according to the present disclosure having the above configuration, the connection member and the reinforcing member are applied to the portion where the trunk lid is fastened to firmly supply the trunk hinge fastened to the package tray.

In addition, the connection member and the reinforcing member may form the load delivery path to deliver the load applied to the rear portion of the vehicle body toward the upper end of the vehicle, thereby improving the rigidity of the rear portion of the vehicle body.

BRIEF DESCRIPTION OF THE DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

Hereinafter, a vehicle body structure with a reinforced trunk hinge mounting part according to the present disclosure is described in detail with reference to the accompanying drawings.

Figure 2:
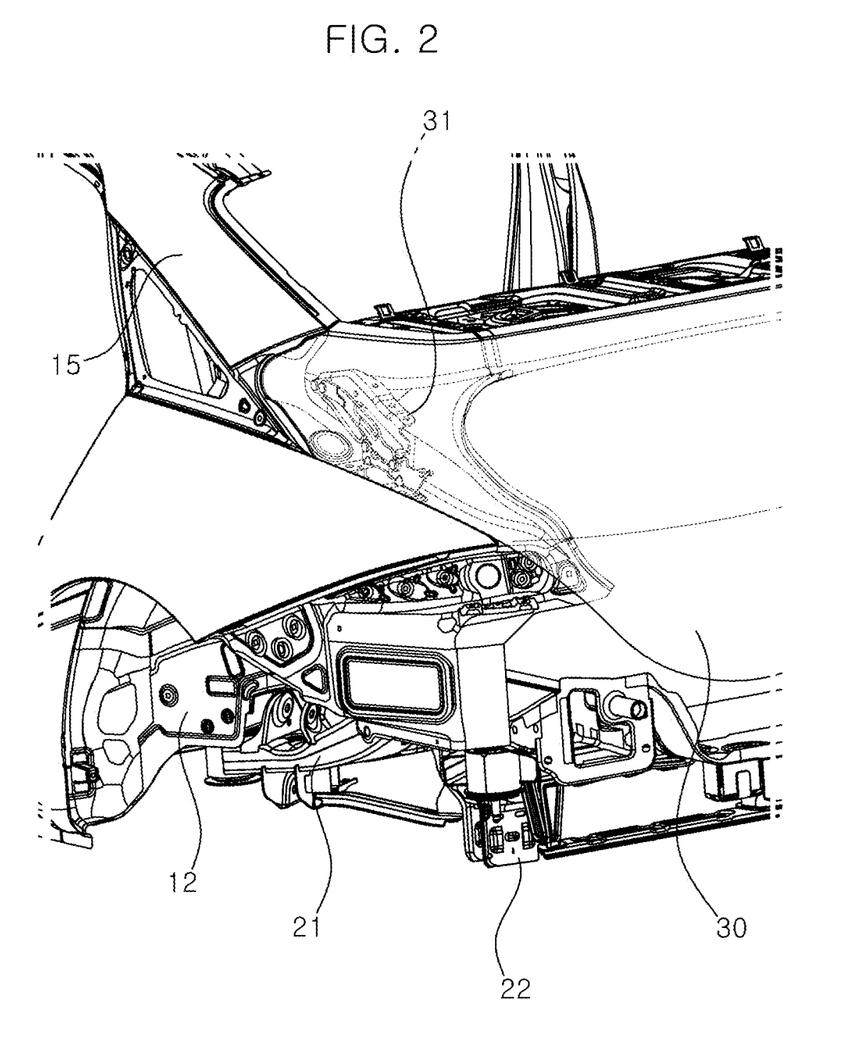
FIG. 2 is a perspective diagram showing a vehicle body structure with a reinforced trunk hinge mounting part according to an embodiment of the present disclosure.
Figure 3:
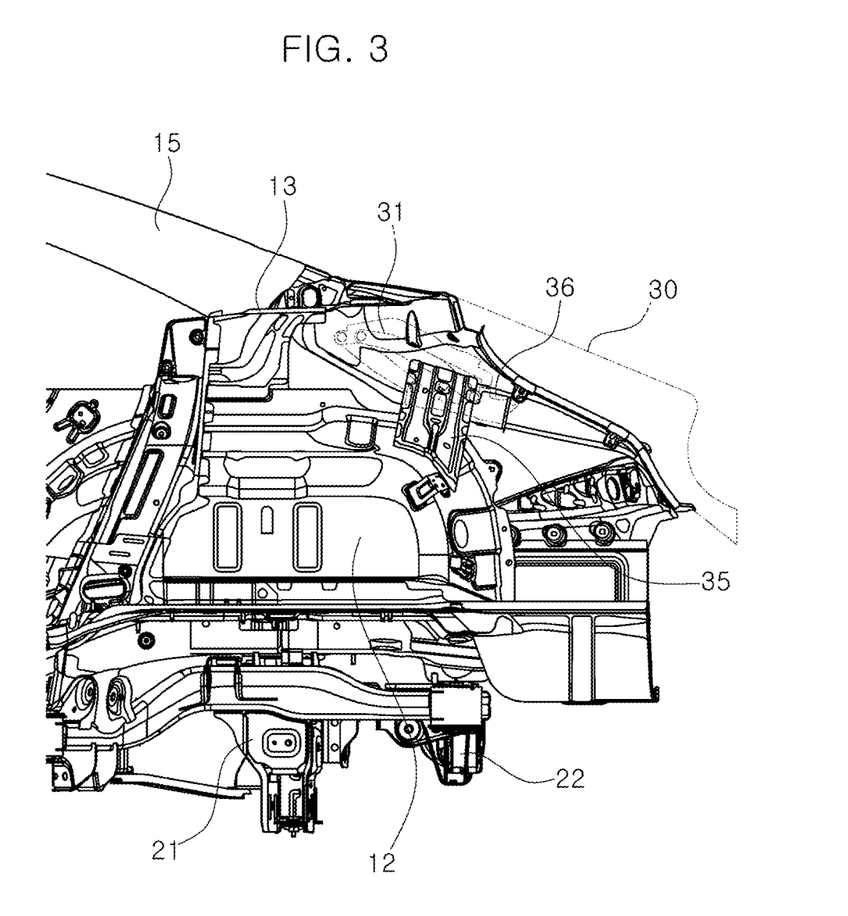
FIG. 3 is a side cross-sectional diagram showing the vehicle body structure with the reinforced trunk hinge mounting part according to an embodiment of the present disclosure.

A vehicle body structure with a reinforced trunk hinge mounting part according to the present disclosure includes a side outer rear extension 11 extending from a side outer 16 to the rear of a vehicle, and a quarter inner 12 which is located under the side outer rear extension 11 and forms a space where wheels of the vehicle are mounted. The vehicle body structure further includes: a trunk hinge 31 installed on a front end of a trunk lid 30 and fastened to an outer surface of the side outer rear extension 11, and a connection member 35 which connects the side outer rear extension 11 to the quarter inner 12 and improves rigidity of a portion where the trunk hinge is mounted on the vehicle body, that is, the trunk hinge mounting part.

The side outer rear extension 11 is extended from the side outer 16 of the vehicle body to the rear of the vehicle. The side outer rear extension 11 is exposed when the trunk lid 30 is opened.

The quarter inner 12 is a so-called 'wheel house' and located under the side outer rear extension 11 and forms a space where the wheels of the vehicle are mounted.

The trunk hinge 31 is installed on the front end of the trunk lid 30 and fastened to the outer surface of the side outer rear extension 11. As the trunk lid 30 rotates through the trunk hinge 31, the trunk lid 30 may be opened.

The trunk hinge 31 may also be formed in a general goose neck type but may be formed in a 4 bar link type that occupies less space while operating.

According to one embodiment of the present disclosure, the portion of the vehicle body where the trunk hinge 31 is fastened, that is, the side outer rear extension 11, has a configuration of reinforcing the rigidity of the vehicle body.

Figure 4:
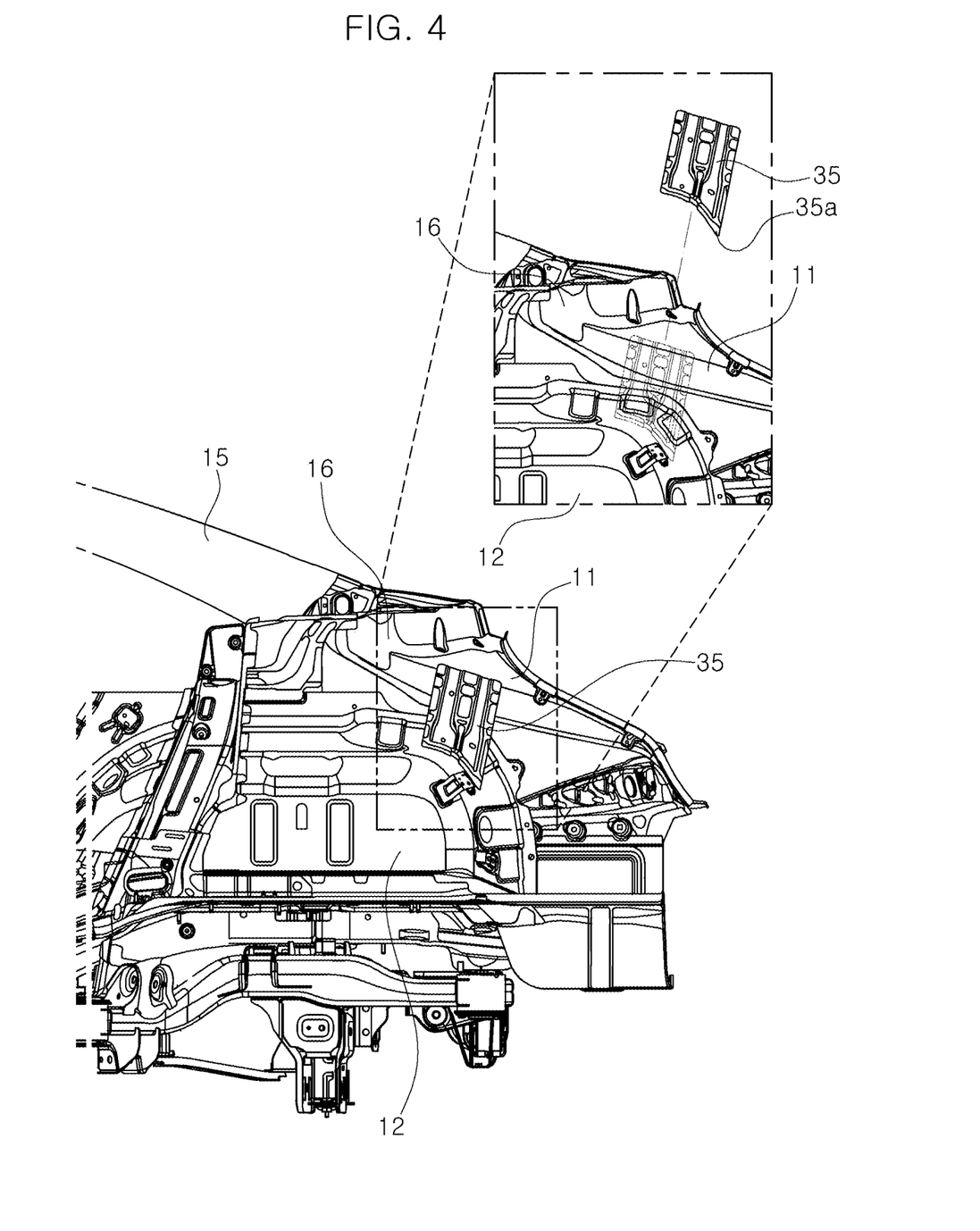
FIG. 4 is an enlarged diagram of a main portion showing a state where a connection member is fastened in the vehicle body structure with the reinforced trunk hinge mounting part according to an embodiment of the present disclosure.

To this end, a connection member 35 connecting the side outer rear extension 11 to the quarter inner 12 is provided.

The connection member 35 is disposed approximately in the vertical direction of the vehicle, so that an upper portion of the connection member 35 is bonded to the side outer rear extension 11 and a lower portion thereof is bonded to the quarter inner 12. The connection member 35 connects the side outer rear extension 11 to the quarter inner 12 spaced apart from each other to form a load delivery path (load path) of 'the quarter inner 12—the connection member 35—the side outer rear extension 11', thereby improving the rigidity of the portion where the trunk hinge 31 is mounted.

The upper portion of the connection member 35 is bonded to one side of the side outer rear extension 11. The side outer rear extension 11 includes: a hinge mounting part 11a formed in the width direction of the vehicle and having the trunk hinge 31 fastened to an upper surface thereof. The side outer rear extension 11 further includes a vertical part 11b extending upward from the hinge mounting part 11a. The connection member 35 connects the side outer rear extension 11 and the quarter inner 12 disposed vertically, and the connection member 35 is bonded to the vertical part 11b of the side outer rear extension 11 perpendicular to the ground.

The lower portion of the connection member 35 is bonded to one side surface of the quarter inner 12. A lower end of the connection member 35 is formed with a lower flange part 35a bent from the longitudinal direction of the connection member 35 so that the connection member 35 is in surface contact with the quarter inner 12 to increase the bonded area. The connection member 35 may be firmly bonded to the quarter inner 12 using the lower flange part 35a.

The upper and lower portions of the connection member 35 may be bonded to the side outer rear extension 11 and the quarter inner 12 by welding.

The trunk hinge 31 and the connection member 35 are disposed in the width direction of the vehicle.

Figure 5:
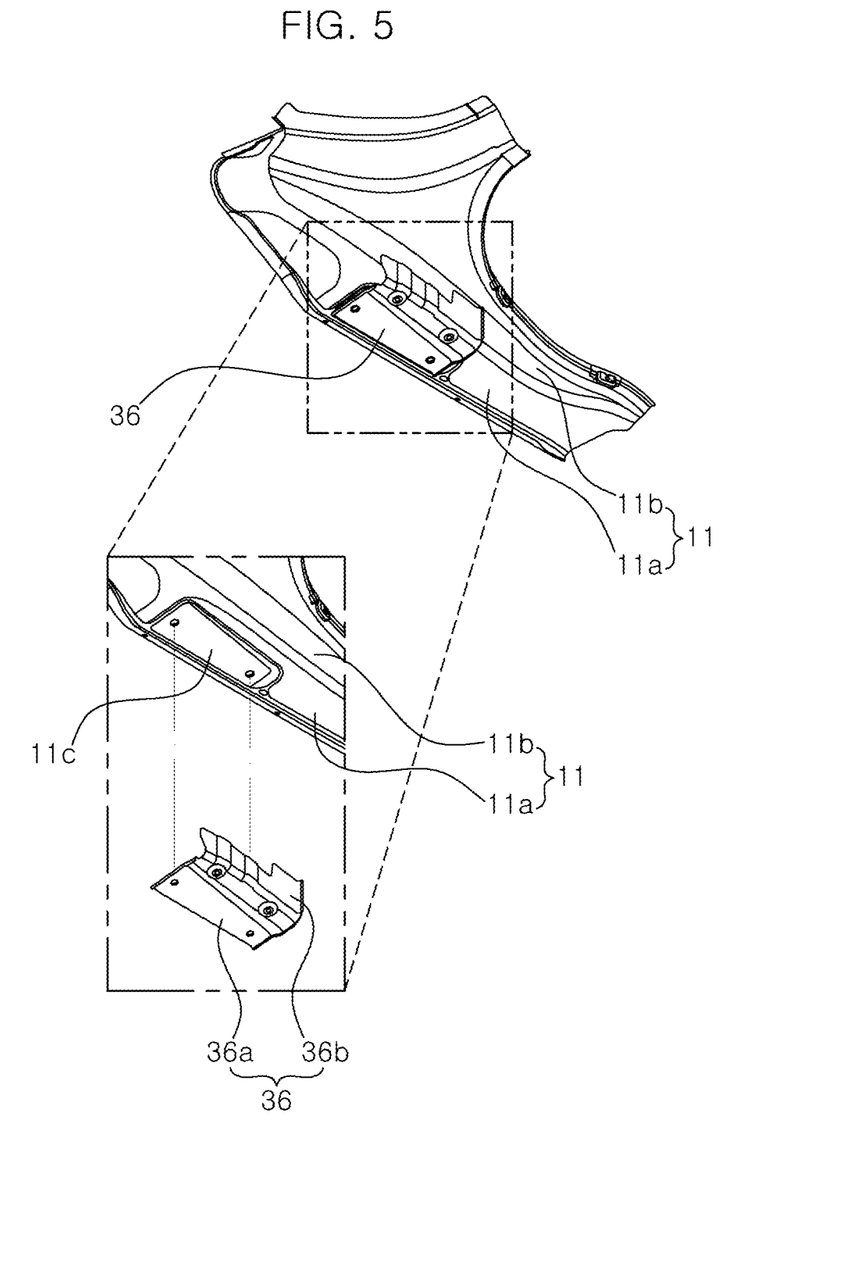
FIG. 5 is an enlarged diagram showing a main portion of a portion where a reinforcing member is fastened in the vehicle body structure with the reinforced trunk hinge mounting part according to an embodiment of the present disclosure.
Figure 6:
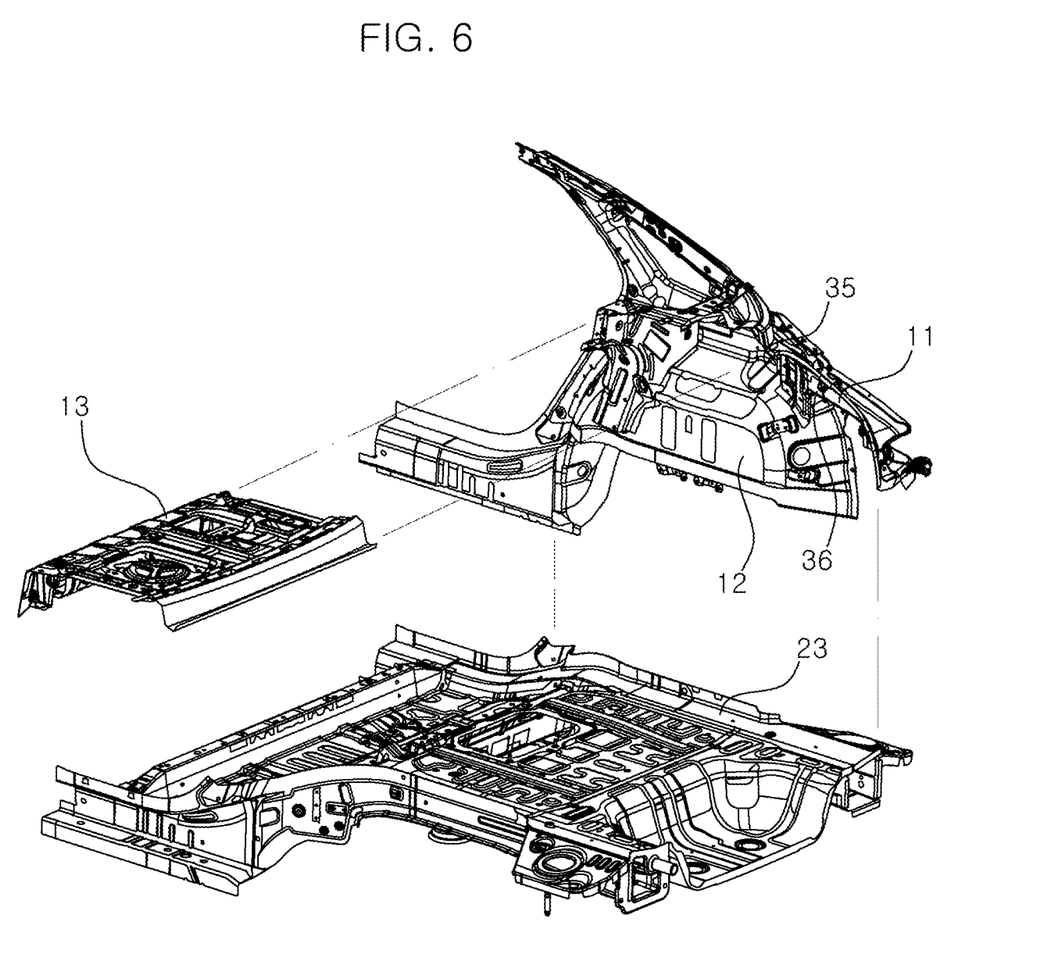
FIG. 6 is a perspective diagram showing a bonding relationship between a package tray bonded to a side outer rear extension and a rear floor according to the vehicle body structure with the reinforced trunk hinge mounting part according to an embodiment of the present disclosure.

Meanwhile, a reinforcing member 36 is provided to reinforce the rigidity of the side outer rear extension 11.

The reinforcing member 36 is bonded to a surface opposite to the surface of the side outer rear extension 11 to which the trunk hinge 31 is fastened. Since the trunk hinge 31 is fastened to the upper surface of the side outer rear extension 11, the reinforcing member 36 is bonded to the lower surface of the side outer rear extension 11.

The reinforcing member 36 includes a fastening part 36a bonded to the lower surface of the side outer rear extension 11, and a reinforcing part 36b extending upward from a side end of the fastening part 36a and bonded to the side outer rear extension 11. Because the reinforcing part 36b is bonded to the vertical part 11b of the side outer rear extension 11, the reinforcing member 36 is bonded to the lower surface and the side surface of the side outer rear extension 11. Accordingly, the portion of the side outer rear extension 11 to which the trunk lid 30 is fastened is double-layered, and thus the trunk hinge is supported by the reinforcing member 36 as well as the side outer rear extension 11.

A mounting groove 11c accommodating the reinforcing member 36 is formed on the lower surface of the side outer rear extension 11 so that a position of the side outer rear extension 11 where the reinforcing member 36 is bonded is limited. In other words, the mounting groove 11c is formed on the lower surface of the hinge mounting part 11a. The trunk hinge 31 is disposed on the upper surface of the hinge mounting part 11a, and the reinforcing member 36 is disposed on the lower surface of the hinge mounting part 11a to be fastened to each other.

When the upper portion of the connection member 35 is bonded to the side outer rear extension 11, a part of the connection member 35 is bonded to the reinforcing part 36b of the reinforcing member 36, and the rest part of the connection member 35 is directly bonded to the vertical part 11b of the side outer rear extension 11.

Figure 7:
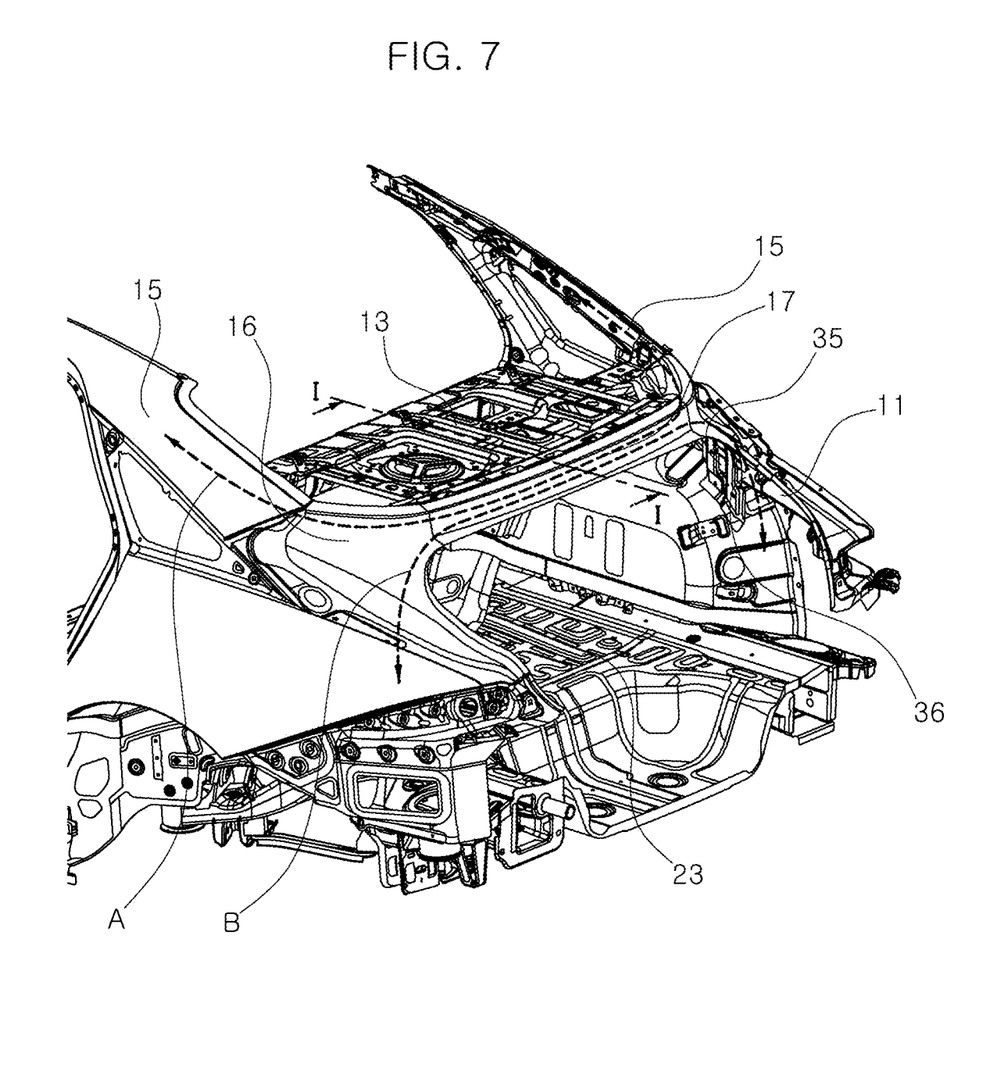
FIGS. 7 and 8 are perspective diagrams showing a load delivery path formed through the connection member and the reinforcing member according to the vehicle body structure with the reinforced trunk hinge mounting part according to some embodiments of the present disclosure.
Figure 8:
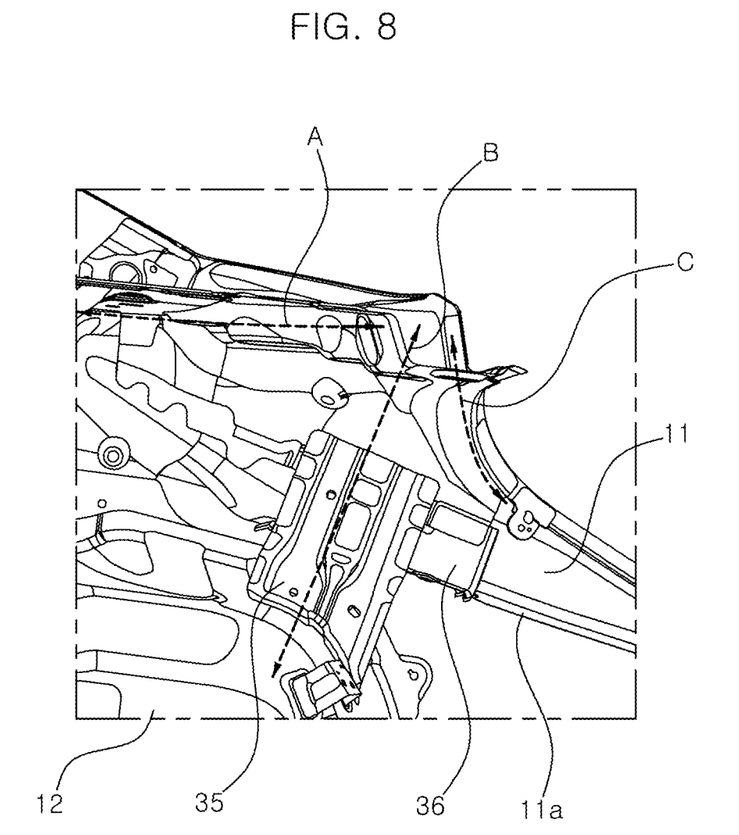
Figure 9:
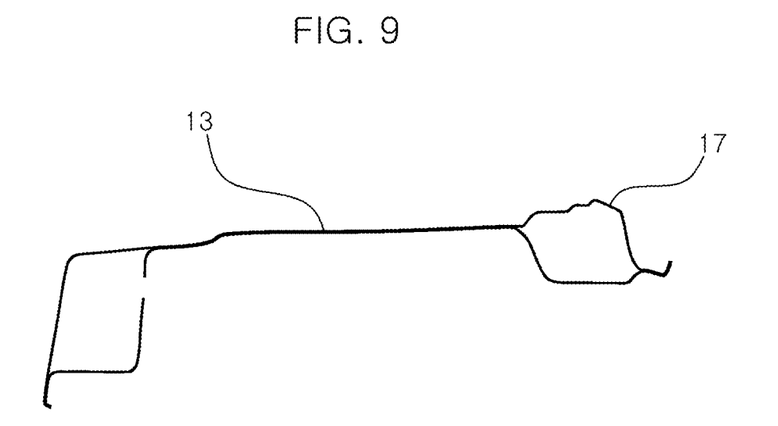
FIG. 9 is a cross-sectional diagram taken along line I-I of FIG. 7.
Figure 10:
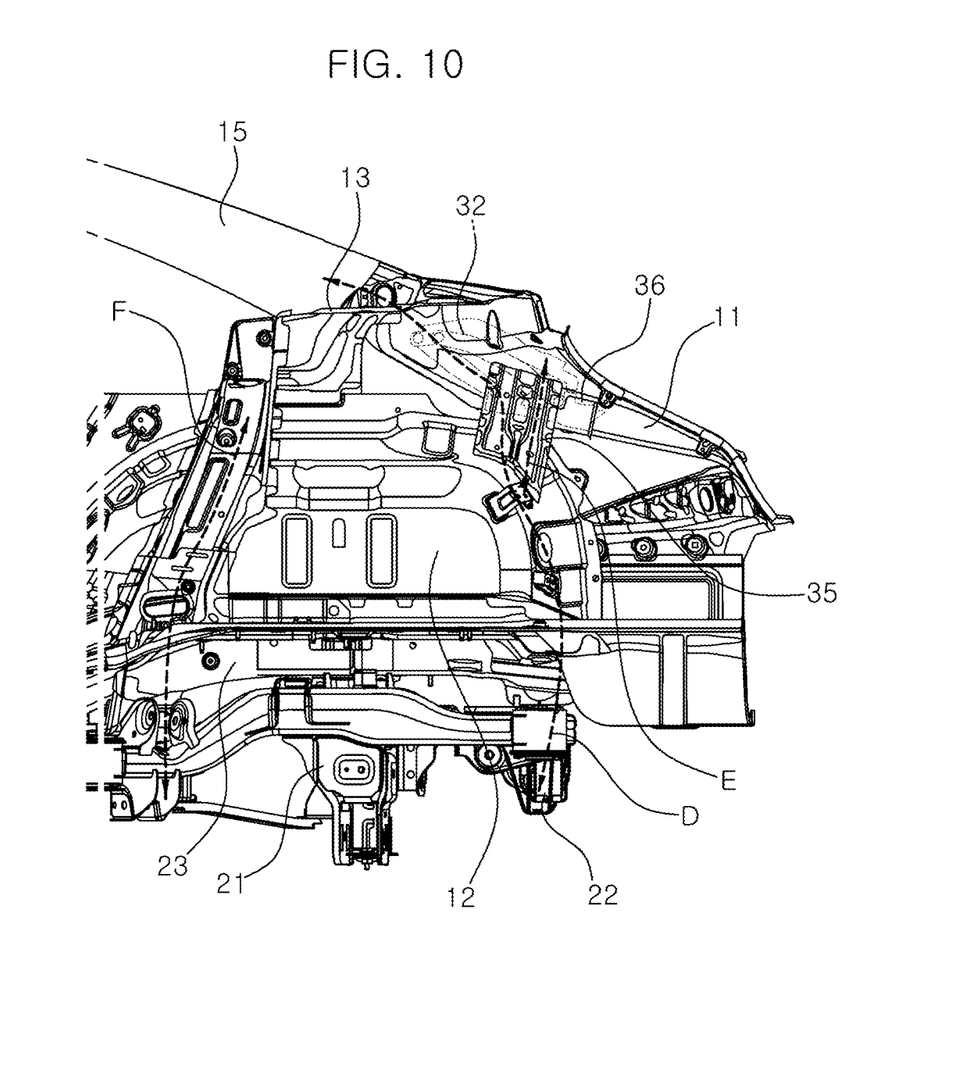
FIG. 10 is a side diagram showing the load delivery path vertically formed on a rear portion of the vehicle body according to the vehicle body structure with the reinforced trunk hinge mounting part according to an embodiment of the present disclosure.

FIGS. 7, 8, and 10 show the load path with dotted arrows, which is formed with the connection member 35 and the reinforcing member 36.

Referring to FIGS. 7 and 8, a load path (see arrow A) connecting the D pillar 15 to an upper end of the trunk opening flange 17 is formed. Another load path (see arrow B) is formed by connecting the quarter inner 12, the upper end of the trunk opening flange 17, the connection member 35, and the reinforcing member 37. The load path reinforces the rigidity of the portion where the trunk lid 30 is mounted together with a load path (see arrow C) passing through the side surface of the trunk opening flange 17.

FIG. 10 shows load paths (see arrows D and F) where the load is delivered upward from a rear mounting 22 on which a rear cross member 21 having a rear wheel mounted on a lower end of the rear floor 23 is mounted through the quarter inner 12.

In particular, in the rear mounting 22 at the rear side, the load paths (see arrows D and E) up to the D pillar 15 through the connection member 35 and the reinforcing member 36 after passing through the quarter inner 12 are shown.

According to the present disclosure, this structure may improve the rigidity of the portion where the trunk lid 30 is mounted. In addition, it is possible to improve the rigidity of the body by delivering the load of the rear wheel side input through the rear portion upward.

What is claimed is:

1. A vehicle body structure with a reinforced trunk hinge mounting part, the vehicle body structure comprising:
   a side outer rear extension extending from a side outer to a rear of a vehicle;
   a quarter inner located under the side outer rear extension and forming a space where wheels of the vehicle are mounted;
   a trunk hinge installed on a front end of a trunk lid and fastened to an outer surface of the side outer rear extension;
   a connection member connecting the side outer rear extension to the quarter inner; and
   a reinforcing member bonded to a surface opposite to a surface of the side outer rear extension to which the trunk hinge is fastened in order to reinforce a rigidity of the side outer rear extension,
   wherein a mounting groove accommodating the reinforcing member is formed on a lower surface of the side outer rear extension, and
   wherein the reinforcing member is seated inside the mounting groove and bonded to the side outer rear extension.

2. The vehicle body structure of claim 1,
wherein the connection member connects the side outer rear extension to the quarter inner by each bonding upper and lower portions of the connection member to the side outer rear extension and the quarter inner spaced apart from each other.

3. The vehicle body structure of claim 1,
wherein the side outer rear extension comprises:
   a hinge mounting part formed in a width direction of the vehicle and having the trunk hinge fastened to an upper surface thereof; and
   a vertical part extending upward from the hinge mounting part, and
   wherein an upper portion of the connection member is bonded to the vertical part.

4. The vehicle body structure of claim 1,
wherein the connection member is formed with a lower flange part bent from a longitudinal direction of the connection member so that a lower portion thereof is in contact with the quarter inner, and
   wherein the lower flange part is in surface contact with and bonded to the quarter inner.

5. The vehicle body structure of claim 1,
wherein the trunk hinge and the connection member are disposed in a width direction of the vehicle.

6. The vehicle body structure of claim 1,
wherein the reinforcing member comprises:
   a fastening part bonded to the lower surface of the side outer rear extension; and
   a reinforcing part extending upward from a side end of the fastening part and bonded to the side outer rear extension.

7. The vehicle body structure of claim 6,
wherein the side outer rear extension comprises:
   a hinge mounting part formed in a width direction of the vehicle and having the trunk hinge fastened to an upper surface thereof; and
   a vertical part extending upward from the hinge mounting part, and
   wherein a portion of an upper portion of the connection member bonded to the vertical part has a part bonded to an outside of the reinforcing member, and a rest portion of the upper portion of the connection member is directly bonded to the vertical part.

8. The vehicle body structure of claim 1,
wherein the trunk hinge is a 4 bar link type.

9. The vehicle body structure of claim 1,
wherein the vehicle is a rear wheel drive vehicle and includes a rear-wheel that is a drive wheel and located in the quarter inner.

* * * * *